May 11, 1943.  S. M. DEL CAMP  2,318,840
MOLDING AND LIKE FASTENERS AND INSTALLATION THEREOF
Filed Aug. 27, 1940
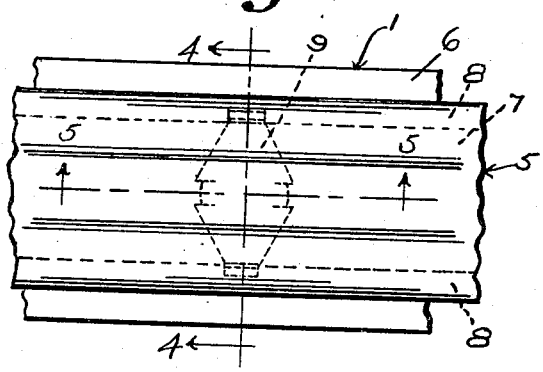
Fig. 1.
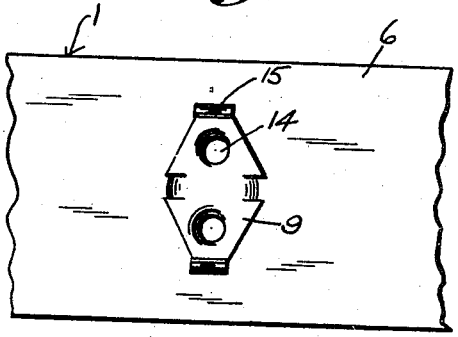
Fig. 2.
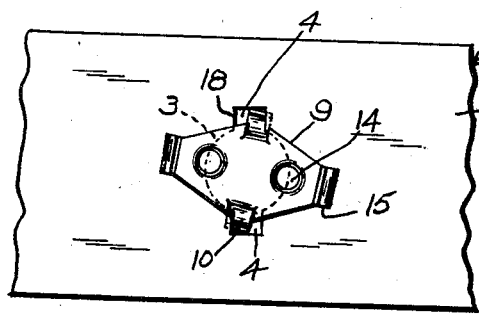
Fig. 3.
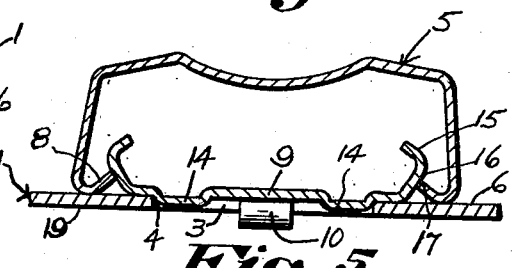
Fig. 4.
Fig. 5.
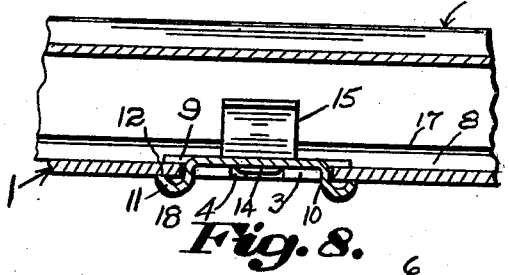
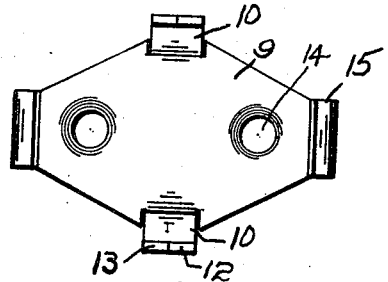
Fig. 6.
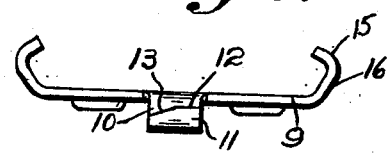
Fig. 7.
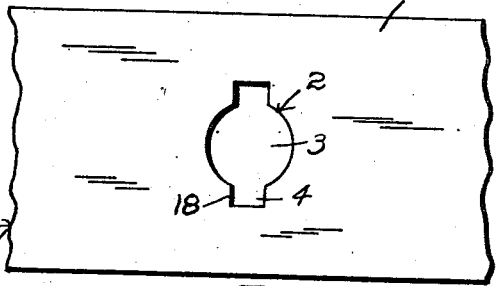
Fig. 8.
Inventor:
Scipione M. Del Camp.
by John Todd
Att'y.

Patented May 11, 1943

2,318,840

UNITED STATES PATENT OFFICE 2,318,840

MOLDING AND LIKE FASTENER AND INSTALLATION THEREOF

Scipione M. Del Camp, Maywood, Ill., assignor to Cinch Manufacturing Corporation, Chicago, Ill., a corporation of Illinois Application August 27, 1940, Serial No. 354,401

6 Claims. (Cl. 189—88)

This invention relates to improvements in fastener members and fastener installations.

The chief object of my invention relates to a fastener member of simple and inexpensive construction providing attaching means for cooperative fastener engagement with a supporting panel to secure the fastener thereto, and also additional attaching portions projecting above the outer side of the panel for engagement with another part such as a supporting strip to secure the strip to the panel.

A further object of my invention is the provision of a fastener providing attaching portions secured in engagement with a panel by rotative movement through an opening of the panel and a base abutting the outer side of the panel and of sufficient area to overlie and substantially seal the opening of the panel when the fastener is in final assembly with the panel.

Other objects and uses of my invention will be apparent from inspection of the drawing and specification hereinbelow set forth.

Referring to the drawing, in which I have illustrated a preferred embodiment of my invention:

Fig. 1 is a plan view of a supporting panel showing a molding strip secured thereto by my improved fastener member;

Fig. 2 is a plan view showing a fastener member in assembly with a panel before attachment of the strip thereto;

Fig. 3 is a view similar to Fig. 2 showing the method by which the fastener member is secured in engagement with the panel;

Fig. 4 is an enlarged section of the installation taken along the line 4—4 of Fig. 1;

Fig. 5 is another enlarged section of the installation taken along the line 5—5 of Fig. 1;

Fig. 6 is a top plan view of my improved fastener member per se;

Fig. 7 is a side elevation of the fastener member shown in Fig. 6; and

Fig. 8 is a plan view of a supporting panel showing an opening therein for receiving attaching portions of the fastener member.

My invention, as illustrated in the accompanying drawing, relates particularly, though not exclusively, to a fastener secured installation wherein hollow molding strips of the type commonly used for ornamenting the exterior of automobiles and the like are secured to a supporting panel. It is common practice in this type of installation to secure the fastener member to a supporting panel through inserting attaching portions of the fastener member through an opening of the panel to engage the rear side thereof. After this action the hollow molding or the like is moved into cooperative fastener engagement with portions of the fastener member so as to be firmly secured adjacent the outer surface of the panel. Many fasteners have been heretofore used for accomplishing assembly of the parts in substantially the order related, but with previously known fasteners an opening remains in the panel around the attaching portions of the fastener member after the fastener has been secured to the panel through which wind, water and dust may pass into the exterior of the automobile body. Automobile manufacturers have been anxious to mend this defect and the fastener member of my present invention is purposely designed to substantially seal the opening of the panel when the parts of the installation are in fastener assembly so as to prevent the passage of foreign matter therethrough.

The particular installation shown in the drawing, by which I have chosen to illustrate the use of my improved fastener members, comprises a thin supporting panel 1 which may be the body of an automobile. The body 1 has an elongated aperture 2 which comprises, in my preferred form, a substantially circular central portion 3 and narrow extensions 4 of this central portion 3 at opposed ends thereof, as most clearly shown in Fig. 8. A molding strip 5 of the type now frequently used for ornamenting the exteriors of automobiles is adapted to be secured in flush relation to the outer surface 6 of the panel 1. The strip 5, in my preferred form, is of hollow construction and has an aperture 7 (Fig. 1) running longitudinally of one of its sides and inwardly extending flanges 8—8 in adjacent relation to the aperture 7 along its length.

Referring in detail to my improved fastener member 9, I have shown one of simple construction preferably made from one piece of spring metal. The fastener has an elongated base portion substantially flat in form and of greater length and width than the opening 2 of the fastener so as to overlie the same when the fastener is finally attached to the panel. Attaching portions in the form of hook-shaped legs 10—10 integrally joined to the longitudinal marginal edges of the base 9 adjacent the center extend out of the plane of the base on one side thereof. The hook-shaped portions 10 open away from each other and have free end portions 11 (Figs. 5 and 7) extending reversely toward the base so that the outermost free edges 12 of the portions 11 substantially face the base. At least one side edge of each of the hook-shaped portions 10 is beveled as at 13 adjacent the free edge 12, as most clearly shown in Fig. 7, thereby providing a camming edge to facilitate attachment of the fastener to the panel in a manner hereinbelow described. A pair of projections, preferably in the form of embossments 14, are formed in the base at predetermined points and extend out of the plane of the base on the same side thereof as the hook-shaped portions 10—10. The embossments 14 are designed to enter cooperative snap fastener engagement with the panel 1 within the extensions 4 of the panel opening 2, as hereinbelow described, to maintain the fastener member in fixed non-rotative relation to the panel in final assembly of the parts. As a means for securing the strip 5 to the panel I have provided ears 15 integral with the base 9 of the fastener adjacent opposed longitudinal ends thereof and projecting out of the normal plane of the base in a direction away from the hook-shaped portions 10. The ears 15 diverge from the base in relation to each other and then converge forming shoulders 16 behind which the free edges 17 of the strip flanges 8 are engaged to secure the strip to the panel (Fig. 4). In my preferred form the ears 15 are rigid in construction and the strip is snapped into fastener engagement with the ears by reason of the natural resiliency of the strip wherein the flanges 8—8 expand during passage over the converging portions of the ears and then contract to engage behind the shoulders 16. It will be understood, however, that the yieldability for effecting snap fastener engagement between the strip and fastener may be provided entirely in the ears.

Assembly of the parts of my installation is a relatively simple matter and is carried out by first moving the fastener member toward the panel 1 so as to dispose the minor axis of the fastener in registering relation to the major axis of the opening 2 whereupon the hook-shaped portions 10 are seated within the lateral extensions 4—4 of the opening 2. Next, the fastener member is rotated in a clockwise direction, viewing Fig. 3, during which action the beveled edges 13 of the hook-shaped portions 10 engage the walls 18 of the panel adjacent the extensions 4 camming the end portions 11 of the hook-shaped portions beneath the inner surface 19 of the panel 1 to engage the free edge 12 of the end portions 11 against the inner surface 19. During this action the embossments 14 ride over the outer surface 6 of the panel and after the fastener has been rotated approximately 90° they register with the lateral extensions 4 of the panel opening 2 and snap into the extensions by reason of the natural resiliency of the base 9 so as to engage the panel 1 between opposed side walls 18 of the extensions 4. Thus the embossments 14 cooperate with the panel to maintain the fastener member in fixed non-rotative position to the panel and a firm attachment of the fastener to the panel is effected.

When the fastener is in final assembly with the panel the base 9 will completely overlie the opening 2 except possibly at points between the wall of the opening and the attaching portions 10. These openings, however, are very small and may be almost completely omitted by holding the dimensions of the panel opening and the fastener member to close tolerances. Thus with my invention it is impossible for any appreciable amount of water or dust to enter the interior of the automobile body through the panel opening and at the same time the fastener provides an inexpensive and highly efficient means of securing the molding strip in firm attachment to the body.

Although I have illustrated and described a preferred embodiment of my invention, I do not wish to be limited thereby because the scope of my invention is best defined by the following claims.

I claim:

1. A fastener member adapted to be secured to a supporting panel comprising a base engageable with one surface of said panel, spaced hook-shaped attaching portions extending from said base, said hook-shaped portions opening in opposite directions, each of said hook-shaped portions having its free edge facing said base and providing a beveled edge on one side of said free edge, and attaching means extending on an opposite side of said base from said hook-shaped portions for fastener engagement with a part to be secured to said panel.

2. A fastener installation comprising, in combination, a supporting panel having an elongated opening, a fastener member formed from a single strip of sheet metal, said fastener having a base engageable with an outer surface of said panel to seal substantialy said opening and hook-shaped attaching portions integrally joined to said base extending on one side thereof, each of said hook-shaped portions being of one thickness of material having its free edge facing said base and providing a beveled edge on one side of said free edge, said hook-shaped portions being movable into said opening in one predetermined position and said beveled edges being engageable with the walls of said opening on rotation of said fastener to cam said free ends of said hook-shaped portions behind the inner surface of said panel to secure said fastener to said panel, and attaching means extending on an opposite side of said base from said hook-shaped portions for fastener engagement with a part to be secured to said panel.

3. A fastener installation comprising, in combination, a supporting panel having an elongated opening, a fastener member having a base engageable with an outer surface of said panel and hook-shaped attaching portions extending from said base on one side thereof, said hook-shaped portions being movable into said opening in one predetermined position of said fastener and engageable behind the inner surface of said panel on rotation of said entire fastener about the axis perpendicular to the plane of the panel, said base having a projection extending on the same side thereof as said hook-shaped portion and cooperable with the walls adjacent said aperture of said panel when said fastener has been rotated a predetermined number of degrees whereby said hook-shaped portions are maintained in engagement with said inner surface, and attaching means extending on an opposite side of said base from said hook-shaped portion for fastener engagement with a part to be secured to said panel.

4. A fastener installation comprising, in combination, a supporting panel providing a central opening and narrow extensions of said central opening on opposed sides thereof, a fastener member having a base engageable with an outer surface of said panel, hook-shaped attaching portions extending from said base into said narrow extensions of said opening of said panel and engageable behind the inner surface of said panel on rotation of said fastener, a projection extending from said base for snap fastener engagement within one of said narrow extensions of said panel opening when said fastener is rotated a predetermined number of degrees and socket-engaging portions on an opposite side of said base from said hook-shaped portions for fastener engagement with a part to be secured to said panel.

5. A fastener installation comprising, in combination, a supporting panel having an aperture and a fastener member secured to said panel, said fastener having attaching means for snap fastener engagement with a part to be secured to said panel and attaching portions movable through said panel aperture in one predetermined position only and rotatable to engage behind said panel, and said fastener also having a portion cooperable between the walls of said panel aperture to maintain said attaching portions in fastening position.

6. A fastener installation comprising, in combination, a supporting panel having an elongated aperture and a fastener member secured to said panel, said fastener having attaching means for snap fastener engagement with a part to be secured to said panel and hook-shaped portions forming an elongated end movable through said panel aperture in one predetermined position only and rotatable to engage behind said panel, and said fastener also having a portion in snap fastener engagement with the walls surrounding said panel aperture to maintain said attaching portions in fastening positioning.

SCIPIONE M. DEL CAMP.